J. LOSAK.
COOPER'S TOOL.
APPLICATION FILED APR. 5, 1912.
1,051,742.
Patented Jan. 28, 1913.
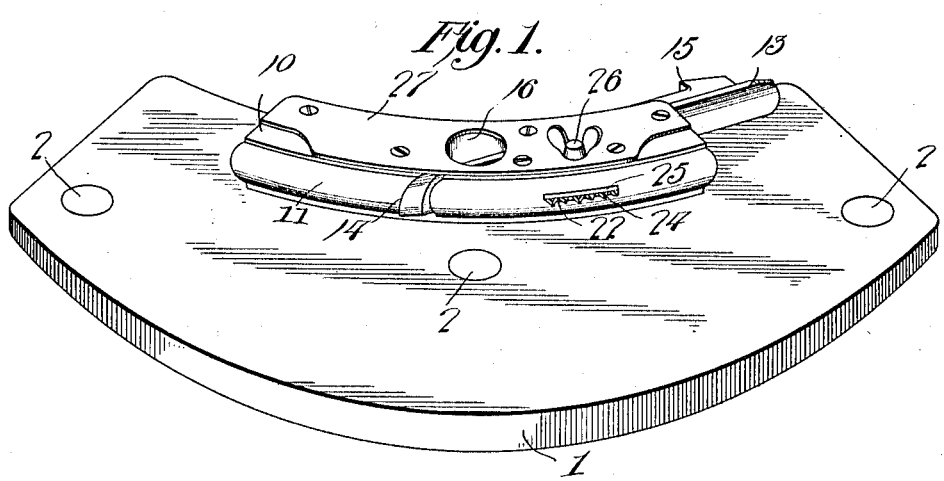
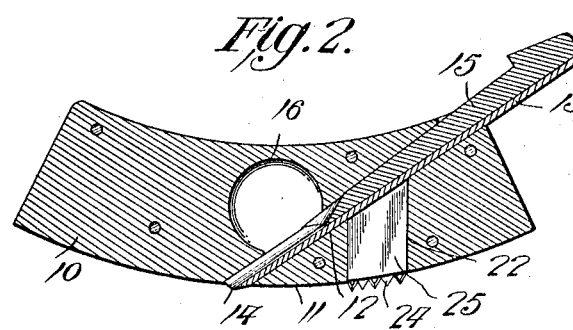
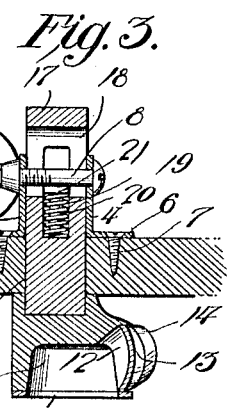
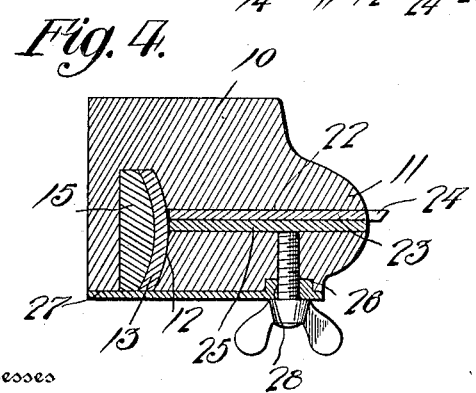
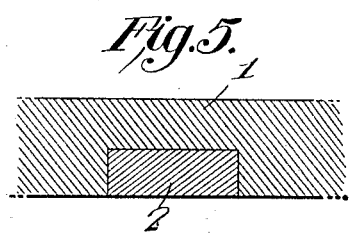
Witnesses
Carroll Bailey.
R. M. Smith.
Inventor
John Losak,
By Victor J. Evans
Attorney

UNITED STATES PATENT OFFICE.

JOHN LOSAK, OF MARCUS HOOK, PENNSYLVANIA.

COOPER'S TOOL.

1,051,742.   Specification of Letters Patent.   Patented Jan. 28, 1913.

Application filed April 5, 1912. Serial No. 688,704.

*To all whom it may concern:*

Be it known that I, JOHN LOSAK, a citizen of the United States, residing at Marcus Hook, in the county of Delaware and State of Pennsylvania, have invented new and useful Improvements in Coopers' Tools, of which the following is a specification.

This invention relates to coopers' tools, the object in view being to provide a hand operated tool for grooving and crozing the staves of a barrel preparatory to the insertion of a barrel head, the device embodying in connection with a stock, a cutter head adjustable with relation to the stock so as to provide for the formation of the groove and croze at any desired distance from the edges of the stave.

With the above and other objects in view, the invention consists in the construction, combination and arrangement of parts, as will be hereinafter more fully described, illustrated in the accompanying drawing, and pointed out in the claim hereunto appended.

Figure 1 is a reverse perspective view of the improved cooper's tool. Fig. 2 is a horizontal section through the cutter head. Fig. 3 is a vertical cross section through the cutter head and through the shank thereof. Fig. 4 is a vertical cross section taken in line with the croze. Fig. 5 is a detail section showing one of the metal inserts in the stock.

The cooper's tool contemplated in this invention comprises essentially a stock 1 which is preferably of segmental form as shown in the drawings and provided with metal inserts 2 arranged in an arc in accordance with the diameter of the barrel to be operated upon, said metal inserts protecting the stock 1 and materially increasing the life and durability thereof. This stock is provided with an aperture 3 on opposite sides of which are arranged clamping jaws or plates 4 and 5 each provided with a base flange 6 which is secured to the top of the stock by means of screws 7 or their equivalent. The upstanding portions of the plates 4 and 5 are provided with holes oppositely arranged to receive a clamping bolt 8 preferably equipped with a thumb nut 9, the purpose of which will hereinafter appear.

The cutter head 10 is segment shaped to agree with the curvature of the inner wall of the barrel staves and the outer edge or periphery thereof is rounded as shown at 11 to accord with the size of the groove to be formed in the inner faces of the staves. The cutter head is provided with an oblique channel 12 for the reception of a cutting bit 13 shaped to form the groove in the barrel, said cutting bit being provided for that purpose with a half round cutting edge 14, which is adjusted so as to project slightly beyond the rounded face 11 of the cutter head, the cutting bit being held in place by means of the usual wedge 15. Centrally the cutter head is provided in its under side with a clearance cavity or recess 16 which is intersected by the channel for the cutting bit as clearly shown in the drawings. On its upper side the cutter head is provided with a vertical shank 17 which extends through the opening 3 in the stock and fits between the plates 4 and 5 above described. This shank is provided with a longitudinal slot 18 through which the clamping bolt 8 passes and within said slot is arranged a coiled expansion spring 19 which exerts a pressure against the clamping bolt 8, serving to press the cutter head downward when the clamping bolt is loosened. In the end portion of said spring is inserted a stud 20 having a head 21 forming a shoulder or seat for the extremity of the spring and also forming a bearing which lies in contact with the clamping bolt 8 and preventing wear upon the extremity of the spring. This spring greatly facilitates the adjustment of the cutter head toward and away from the stock so as to regulate the depth at which the cutter head will operate below the top edge of the barrel. The cutter head is further provided with a recess or slot 22 extending transversely thereof and intersecting the channel in which the cutter bit 13 lies. In this recess 22 is arranged a crozing bit 23 provided with saw shaped teeth 24 and of a width adapted to cut a kerf sufficiently wide to receive the edge of the barrel head. Arranged at the side of the crozing bit is a clamping plate and depth gage 25 against which bears the inner end of a binding screw 26 for holding the depth gage and crozing bit in fixed relation to the cutter head. Secured to the bottom of the cutter head is a metal plate 27 which is tapped and threaded as shown at 28 to receive the binding screw 26.

I claim:—

A cooper's tool, comprisig a segmental cutter head, a shank extending at a right angle to the plane of the head and provided with opposite flat faces and a longitudinal slot therein, an expansion spring in said slot, a stock adjustable on said shank toward and away from the cutter head, flat shank clamping jaws extending upwardly from the stock on opposite sides of the shank, and a clamping bolt passing through the slot and connecting the clamping jaws and acting to draw the same tightly against the shank.

In testimony whereof I affix my signature in presence of two witnesses.

JOHN LOSAK.

Witnesses:
 FRANK D. VERNON,
 G. U. VERNON, Jr.